(12) United States Patent
Sylvester et al.

(10) Patent No.: US 11,833,712 B2
(45) Date of Patent: *Dec. 5, 2023

(54) TOOL FOR FORMING A CAVITY IN A MODULAR PAVEMENT SLAB AND METHOD OF FABRICATING PAVEMENT SLABS

(71) Applicant: Integrated Roadways, LLC, Kansas City, MO (US)

(72) Inventors: Tim Sylvester, Raytown, MO (US); Jeff Courtney, McPherson, KS (US); Brad Werth, Wichita, KS (US)

(73) Assignee: Integrated Roadways, LLC, Kansas City, MO (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/385,217

(22) Filed: Jul. 26, 2021

(65) Prior Publication Data
US 2021/0347087 A1 Nov. 11, 2021

Related U.S. Application Data

(63) Continuation-in-part of application No. 16/804,746, filed on Feb. 28, 2020, now Pat. No. 11,104,033.
(Continued)

(51) Int. Cl.
*B28B 7/16* (2006.01)
*B28B 7/28* (2006.01)
(Continued)

(52) U.S. Cl.
CPC ............. *B28B 7/164* (2013.01); *B28B 7/162* (2013.01); *E01C 5/06* (2013.01); *E01C 5/065* (2013.01); *E01C 11/06* (2013.01); *E04G 15/04* (2013.01)

(58) Field of Classification Search
CPC ........... E04G 15/04; B28B 7/16; B28B 7/162; B28B 7/164; B28B 7/28; B28B 7/303;
(Continued)

(56) References Cited

U.S. PATENT DOCUMENTS 2,775,017 A * 12/1956 McDonough ............. E04B 5/48
249/83
3,209,057 A * 9/1965 Lassman .................... B28B 7/44
264/109
(Continued)

FOREIGN PATENT DOCUMENTS

CA 2794784 A1 * 5/2013 ............... E04B 1/41
CH 451459 A * 5/1968 ........... B28B 7/0014
(Continued)

*Primary Examiner* — Michael Safavi
(74) *Attorney, Agent, or Firm* — HOVEY WILLIAMS LLP

(57) ABSTRACT

A modular pavement slab including a paving material set around a plurality of forming tools and defining a side face and a top surface. Each of the forming tools includes an elongate body extending along a longitudinal axis and having a sidewall exterior surface configured for removal of the elongate body through the side face. Each of the forming tools also includes a riser releasably coupled to the elongate body and extending in a direction noncollinear to the corresponding longitudinal axis.

20 Claims, 11 Drawing Sheets

Related U.S. Application Data

(60) Provisional application No. 62/811,953, filed on Feb. 28, 2019.

(51) Int. Cl.
    *E01C 5/06*          (2006.01)
    *E01C 11/06*        (2006.01)
    *E04G 15/04*        (2006.01)

(58) Field of Classification Search
CPC . E01C 5/06; E01C 5/065; E01C 11/04; E01C 11/06; E01C 2201/16; E01C 2201/167
See application file for complete search history.

(56) References Cited

U.S. PATENT DOCUMENTS

| | | | | |
|---|---|---|---|---|
| 3,809,513 | A * | 5/1974 | Sellers | B28B 7/46 425/84 |
| 5,366,672 | A * | 11/1994 | Albrigo | B28B 23/043 264/219 |
| 6,192,647 | B1 * | 2/2001 | Dahl | E04C 3/34 403/300 |
| 7,134,805 | B2 * | 11/2006 | Yee | F16L 13/113 404/50 |
| 7,669,333 | B2 * | 3/2010 | van Rijn | E04B 1/483 29/897.34 |
| 8,840,336 | B2 * | 9/2014 | Smith | E04B 1/41 404/56 |
| 9,139,962 | B2 * | 9/2015 | Smith | E01C 23/06 |
| 9,340,930 | B2 * | 5/2016 | Sylvester | E01C 5/00 |
| 9,611,593 | B2 * | 4/2017 | Schenk | E01C 5/003 |
| 9,920,490 | B2 * | 3/2018 | Sylvester | E01C 5/005 |
| 2009/0263185 | A1 * | 10/2009 | Yee | E04C 5/165 403/314 |
| 2014/0270947 | A1 * | 9/2014 | Ulislam | E01C 5/06 404/40 |
| 2015/0078822 | A1 * | 3/2015 | Backhaus | E01C 5/003 404/47 |
| 2018/0051424 | A1 * | 2/2018 | Ulislam | E01C 11/04 |

FOREIGN PATENT DOCUMENTS

| | | | | |
|---|---|---|---|---|
| DE | 3123641 | A1 * | 3/1982 | E04C 5/12 |
| FR | 577359 | A * | 9/1924 | B28B 7/0088 |
| JP | 2001047426 | A * | 2/2001 | E01C 5/005 |
| JP | 2005059394 | A * | 3/2005 | B28B 7/162 |
| JP | 4635104 | B1 * | 2/2011 | E01C 15/00 |
| KR | 101731382 | B1 * | 4/2017 | |
| KR | 20180098012 | A * | 9/2018 | |
| WO | WO-2004002701 | A2 * | 1/2004 | E04G 21/142 |
| WO | WO-2013134703 | A1 * | 9/2013 | E01C 9/00 |
| WO | WO-2014159417 | A2 * | 10/2014 | E01C 11/16 |

\* cited by examiner

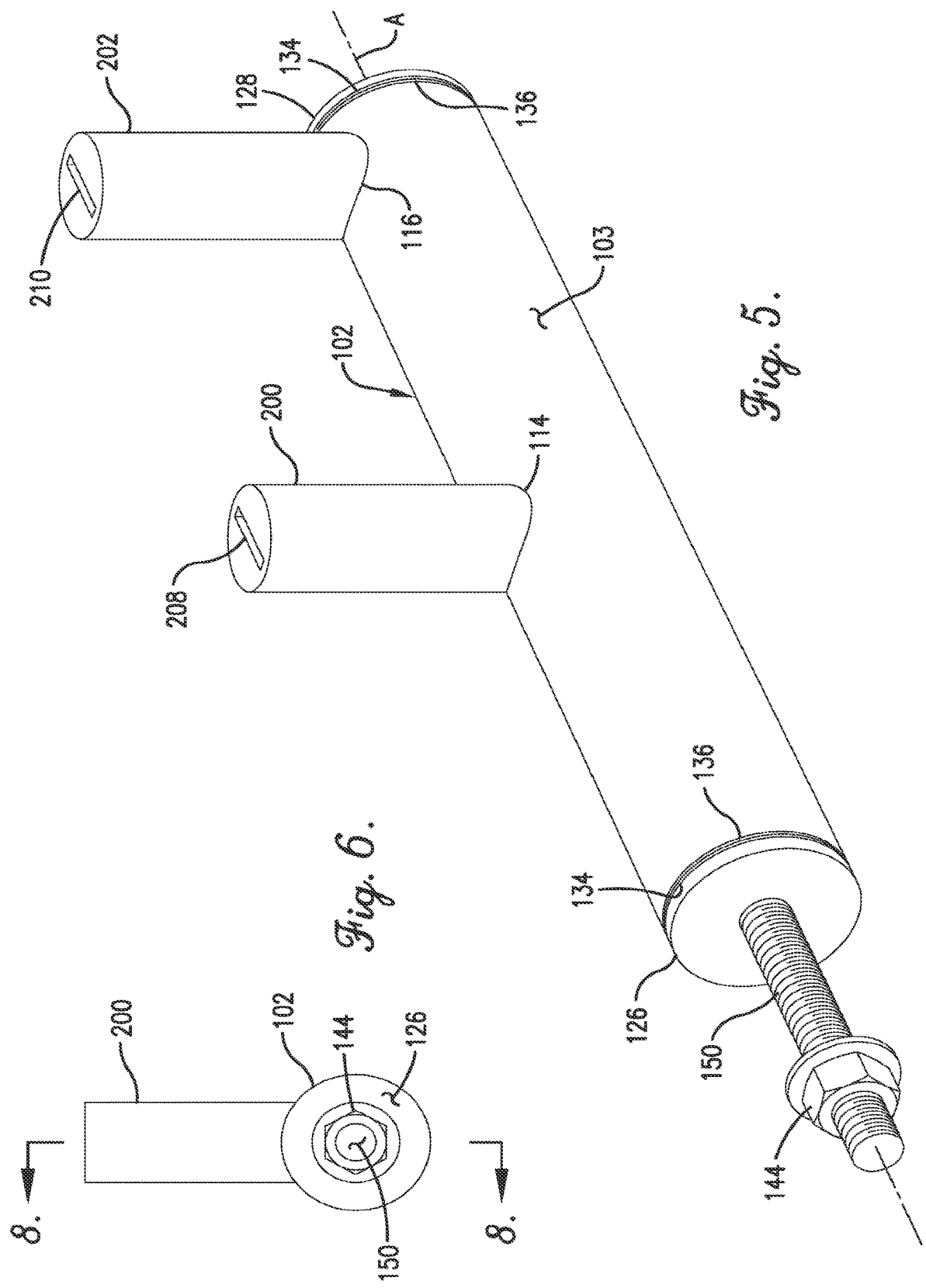

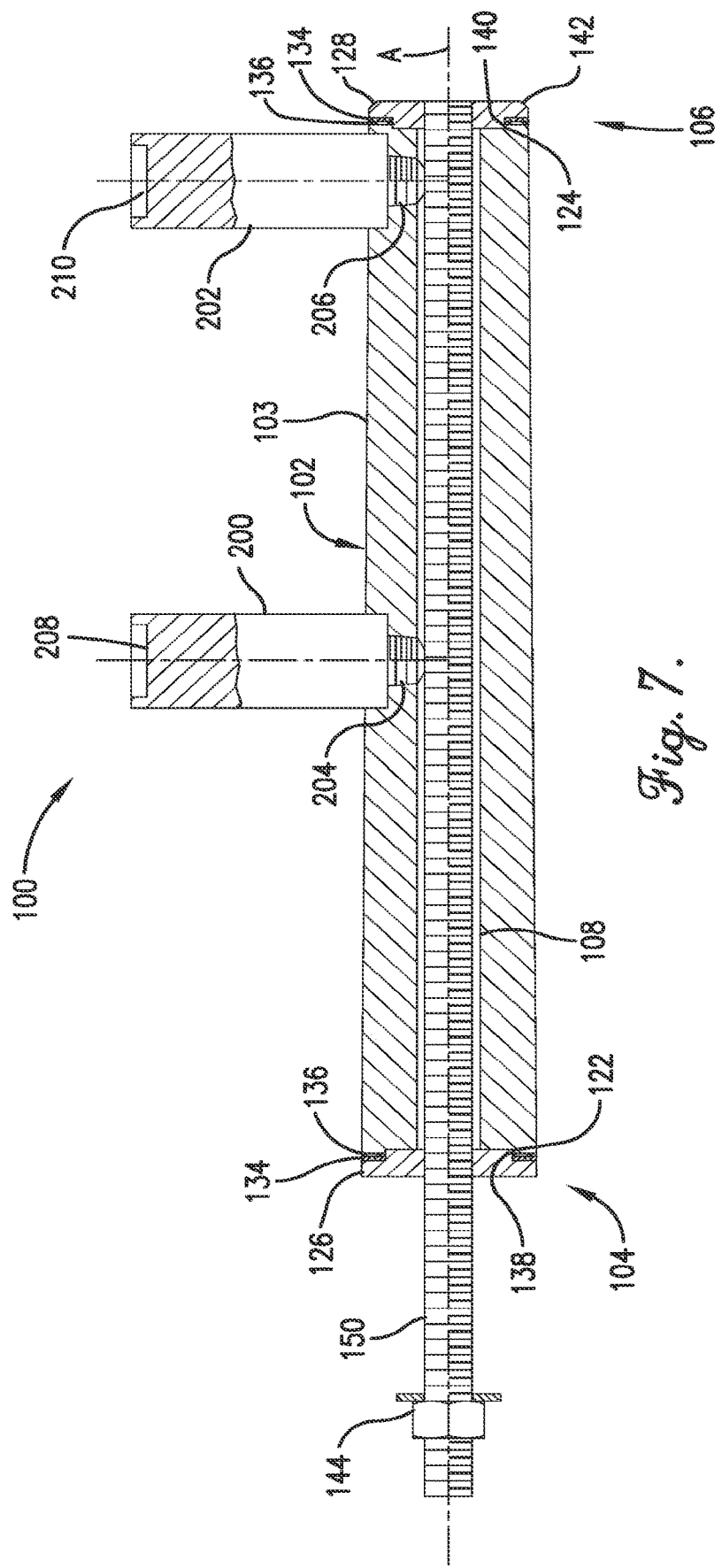

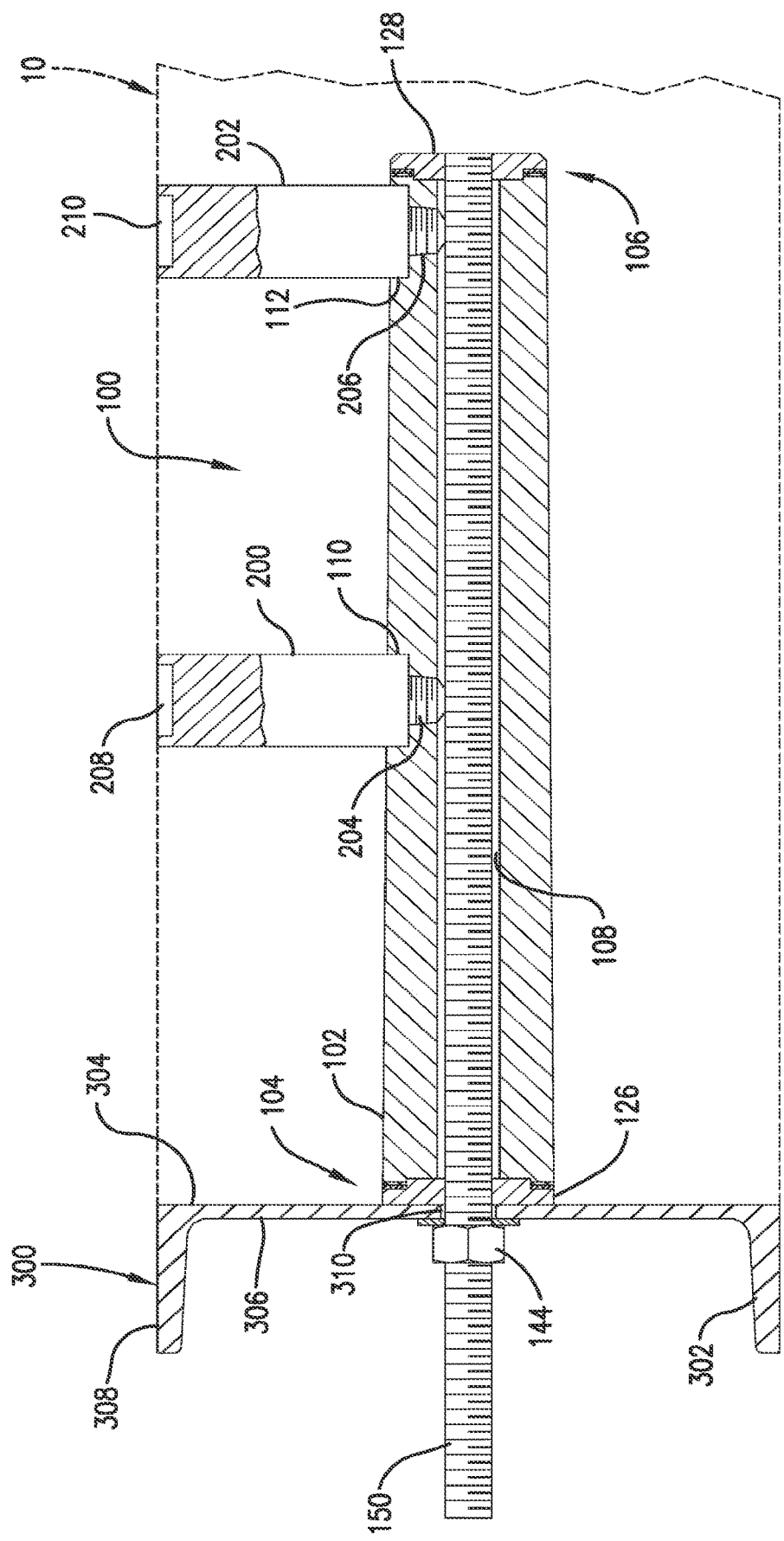

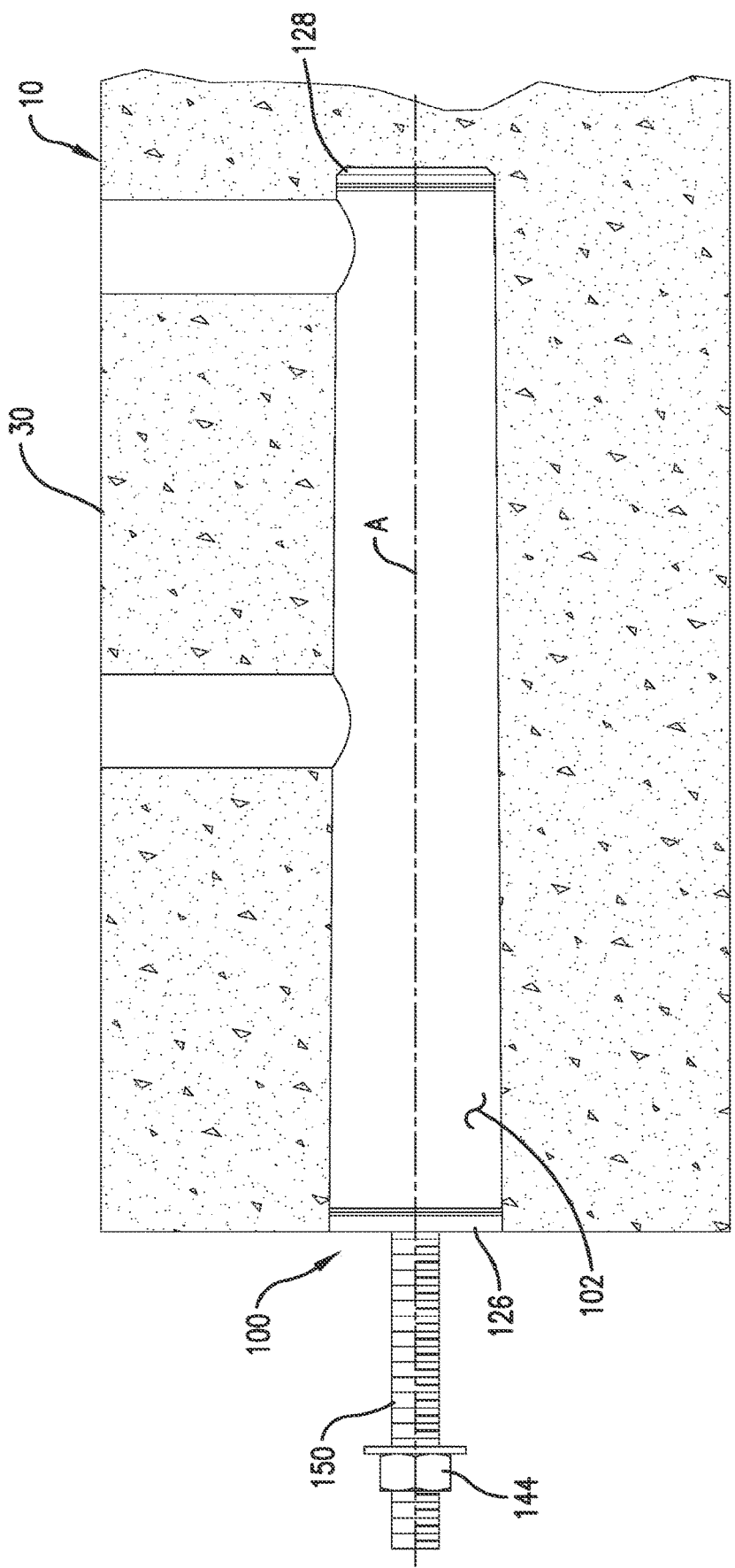

TOOL FOR FORMING A CAVITY IN A MODULAR PAVEMENT SLAB AND METHOD OF FABRICATING PAVEMENT SLABS

CROSS-REFERENCE TO RELATED APPLICATIONS

The present application is a continuation-in-part application of identically-titled U.S. patent application Ser. No. 16/804,746, filed Feb. 28, 2020, which, in turn, claims priority from U.S. Provisional Patent Application No. 62/811,953, filed Feb. 28, 2019, and entitled FORMING TOOL AND METHOD OF FABRICATING PAVEMENT SLABS, and the entire disclosure of each of the aforementioned applications is hereby incorporated by reference herein.

FIELD OF THE DISCLOSURE

The present invention relates to apparatuses and methods for preparing paving apparatuses. The present invention more particularly relates to improved apparatuses and methods for preparing pre-fabricated, modular pavement.

BACKGROUND

It is known to join adjacent modular pavement slabs to enable two-dimensional load transfer between the slabs. For example, U.S. Pat. No. 5,586,834 to Tsuji discloses a simple arrangement in which a reinforcing bar 5 is installed by centering it between long and short cavities 4, 9 of respective adjoining slabs. The bar 5 may be centered by pulling a flexible hauling member 13 through a guide passage 11 and horizontal hole 9 in the short cavity slab to move the bar 5 from the long cavity 4. Once the bar 5 is centered between the slabs, the long and short cavities may be grouted by a filler charging device connected via apertures adjacent the ends of the cavities. (Tsuji, FIG. 1 and cols. 3-4.)

Moreover, the present applicant has invented new apparatuses and methods for improved coupling of adjacent modular pavement slabs, as described in U.S. Pat. No. 9,920,490 to Sylvester, filed May 16, 2016, and entitled MODULAR PAVEMENT SYSTEM, the entirety of which is hereby incorporated herein by reference.

It is desirable to provide an improved apparatus and method of fabrication for modular pavement slabs, such as the slabs described in Sylvester.

This background discussion is intended to provide information related to the present invention which is not necessarily prior art.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a forming tool for forming a cavity in a modular pavement slab fabricated using a form including a header is provided. The forming tool includes an elongate body extending along a longitudinal axis and having a proximal end and a distal end. The proximal end of the elongate body is configured for releasable connection to the header. The forming tool also includes a riser having a proximal end and a distal end. The proximal end of the riser is releasably connected to the elongate body and the riser extends from the elongate body in a direction noncollinear to the longitudinal axis. The elongate body includes a sidewall exterior surface tapered from the proximal end of the elongate body toward the distal end of the elongate body.

In another aspect, a form for a modular pavement slab having pluralities of long and short cavities alternatingly formed around a periphery of the modular pavement slab is provided. The form includes a header configured to define at least a portion of the periphery of the modular pavement slab during formation of the modular pavement slab. The form also includes at least two short forming tools releasably coupled to the header. Each short forming tool has a short elongate body and a first riser coupled to the short elongate body. The form also includes at least two long forming tools releasably coupled to the header and disposed alternatingly with the short forming tools. Each long forming tool has a long elongate body having a length that is longer than each of the at least two short elongate bodies, as well as second and third risers coupled to the long elongate body.

In yet another aspect, a method of forming a modular pavement slab having a plurality of cavities formed around a periphery of the modular pavement slab is provided. The method includes: positioning a header of a form for receiving a paving material; coupling a plurality of forming tools to the header, each forming tool comprising an elongate body defining a longitudinal axis and a riser releasably coupled to the elongate body and extending in a direction that is noncollinear to the longitudinal axis; pouring the paving material into the form and around the forming tools and allowing the paving material to set to define the modular pavement slab; removing each of the risers from the modular pavement slab; and removing each of the elongate bodies from the modular pavement slab.

In still yet another aspect, a modular pavement slab is provided. The slab includes a paving material set around a plurality of forming tools and defining a side face and a top surface. Each of the forming tools includes an elongate body extending along a longitudinal axis and having a sidewall exterior surface configured for removal of the elongate body through the side face. Each of the forming tools also includes a riser releasably coupled to the elongate body and extending in a direction noncollinear to the corresponding longitudinal axis.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 5 is a perspective view of the assembled long forming tool shown in FIG. 4;

FIG. 6 is an end view of the long forming tool shown in FIG. 5;

FIG. 7 is a side sectional view of the long forming tool, taken along line 7-7 of FIG. 6;

FIG. 9 is a side sectional view of the long forming tool shown in FIG. 5 assembled to a header;

FIG. 10 is a side sectional view of the modular pavement slab shown in FIG. 1, illustrating the long forming tool shown in FIG. 5 positioned within a long cavity with risers removed;

Figure 1:
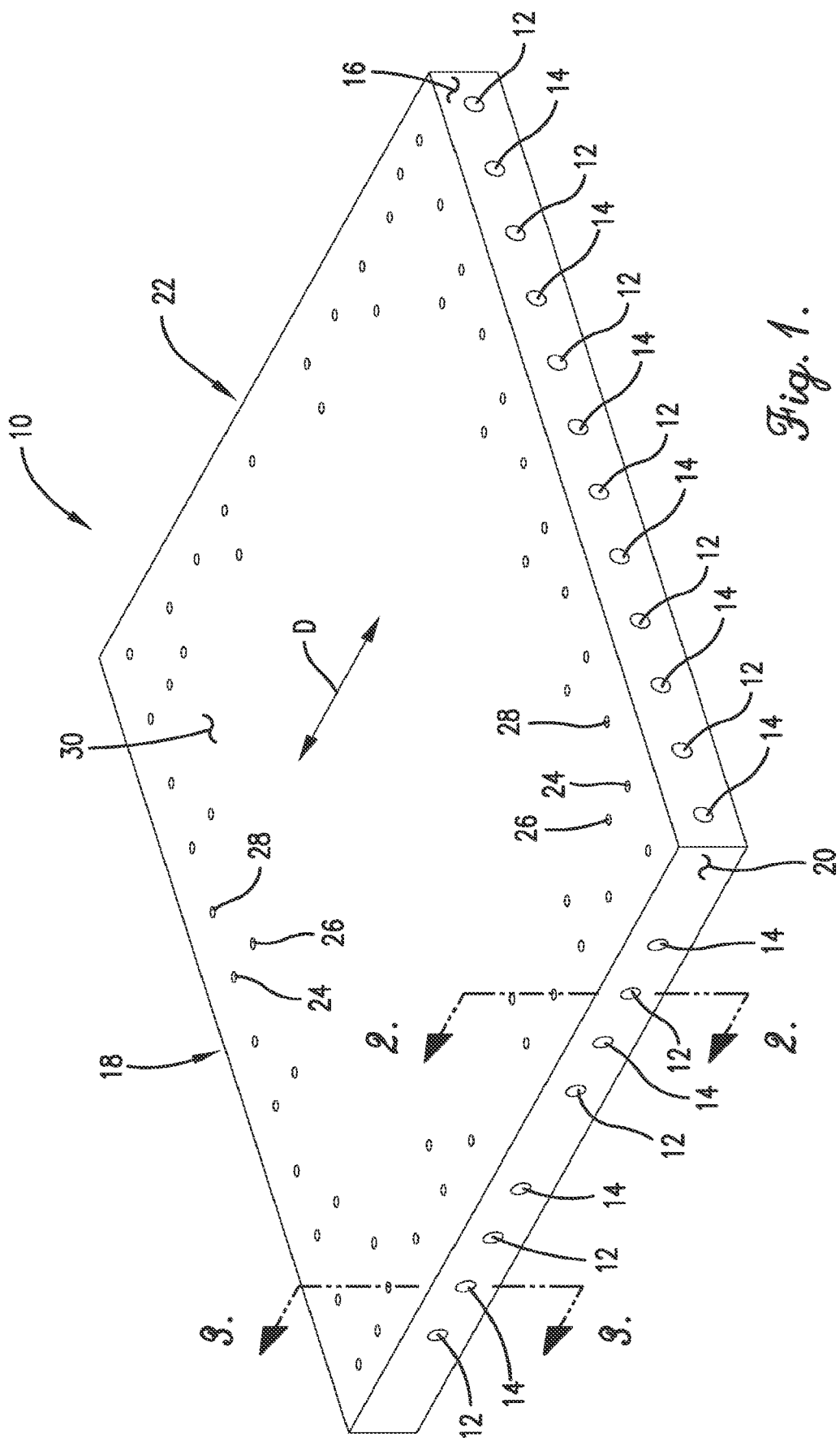
FIG. 1 is an exemplary modular pavement slab fabricated with alternating pluralities of long and short cavities formed around a periphery of the modular pavement slab, in accordance with one aspect of the present invention.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein. Further, while the drawings do not necessarily provide exact dimensions or tolerances for the illustrated components or structures, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

FIG. 1 illustrates an exemplary modular pavement slab 10 fabricated with a plurality of long cavities 12 and short cavities 14 alternatingly formed around a periphery of the modular pavement slab 10, in accordance with one aspect of the present invention. In the exemplary embodiment, the modular pavement slab 10 includes a first face 16 and an opposite, parallel second face 18. The first and second faces 16 and 18 extend generally in a direction that is perpendicular to a direction "D" of anticipated travel for vehicles. The modular pavement slab 10 also includes a third face 20 and an opposite, parallel fourth face 22 extending substantially perpendicular to the first and second faces 16 and 18. The modular pavement slab 10 is fabricated in the general form of a square. It is contemplated, however, that the modular pavement slab 10 may be fabricated in any shape that enables the modular pavement slab 10 to function as described herein.

In the exemplary embodiment, the plurality of long cavities 12 are substantially evenly spaced along the first face 16. Though offset with respect to the long cavities 12 of the first face 16, the plurality of long cavities 12 disposed along the second face 18 are also substantially evenly spaced (not shown). In addition, the plurality of short cavities 14 are substantially evenly spaced along the first face 16. Though offset with respect to the short cavities 14 of the first face 16, the plurality of short cavities 14 disposed along the second face 18 are also substantially evenly spaced (not shown). As shown in FIG. 1, in the exemplary embodiment, the long cavities 12 alternate with the short cavities 14. Moreover, each short cavity 14 is positioned on the second face 18 opposite a respective long cavity 12 on the first face 16, and each long cavity 12 is positioned on the second face 18 opposite a respective short cavity 14 on the first face 16. This facilitates assembly to adjacent modular pavement slabs 10 during installation, with short cavities 14 aligned with long cavities 12 of an adjacent modular pavement slab 10.

It is contemplated that in some embodiments, one of the first or second faces 16 and 18 may include, exclusively, a plurality of long cavities 12, with the other of the first or second faces 16 and 18 exclusively including a plurality of short cavities 14. It is further contemplated that in some suitable embodiments, one of the first or second faces 16 and 18 may include any desirable pattern of long and short cavities 12 and 14, with the other of the first or second faces 16 and 18 including a complementary pattern of short and long cavities 14 and 12 that enables the modular pavement slabs 10 to be assembled as described herein. For example, and without limitation, in one suitable embodiment, the first face 16 may include approximately half of its total cavities being grouped together as adjacent long cavities 12 and the remaining half of its total cavities being grouped together as adjacent short cavities 14. The opposite, second face 18 may include a complementary arrangement of cavities wherein approximately half of its total cavities include a group of adjacent short cavities 14 and the remaining half of its total cavities include a group of adjacent long cavities 12.

In the exemplary embodiment, each of the third and fourth faces 20 and 22 of the modular pavement slab 10 includes pluralities of long cavities 12 and short cavities 14, arranged in two (2) spaced groupings. Within each grouping, a subset of the long cavities 12 are spaced alternatingly with a subset of the plurality of short cavities 14. Moreover, each short cavity 14 is positioned on the fourth face 22 opposite a respective short cavity 14 on the third face 20, and each long cavity 12 is positioned on the fourth face 22 opposite a respective long cavity 12 on the third face 20.

As described herein, the pluralities of long and short cavities 12 and 14 are generally evenly spaced along the faces 16, 18, 20, and 22. More particularly, in a preferred embodiment of the present invention, the pluralities of long and short cavities 12 and 14 are spaced about twelve inches (12") center-to-center along the first and second faces 16 and 18, and, similarly, about twelve inches (12") center-to-center within each grouping on the third and fourth faces 20 and 22. It is noted that the modular pavement slab 10 includes some additional space between the groupings on the third and fourth faces 20 and 22.

As illustrated in FIG. 1, each of the long cavities 12 intersects with a first vertical passage 24 proximate the edge of the modular pavement slab 10 and a second vertical passage 26 adjacent its internal terminus. In addition, each of the short cavities 14 intersects with a third vertical passage 28 proximate the edge of the modular pavement slab 10. The vertical passages 24, 26, and 28 provide access to the interior portion of the cavities 12 and 14 through a substantially horizontal top surface 30 of the modular pavement slab 10 during assembly of a plurality of modular pavement slabs 10 into an installed portion of pavement. In addition, the vertical passages 24, 26, and 28 may also provide points for filling and/or points of ventilation during filling or grouting processes.

Figure 2:
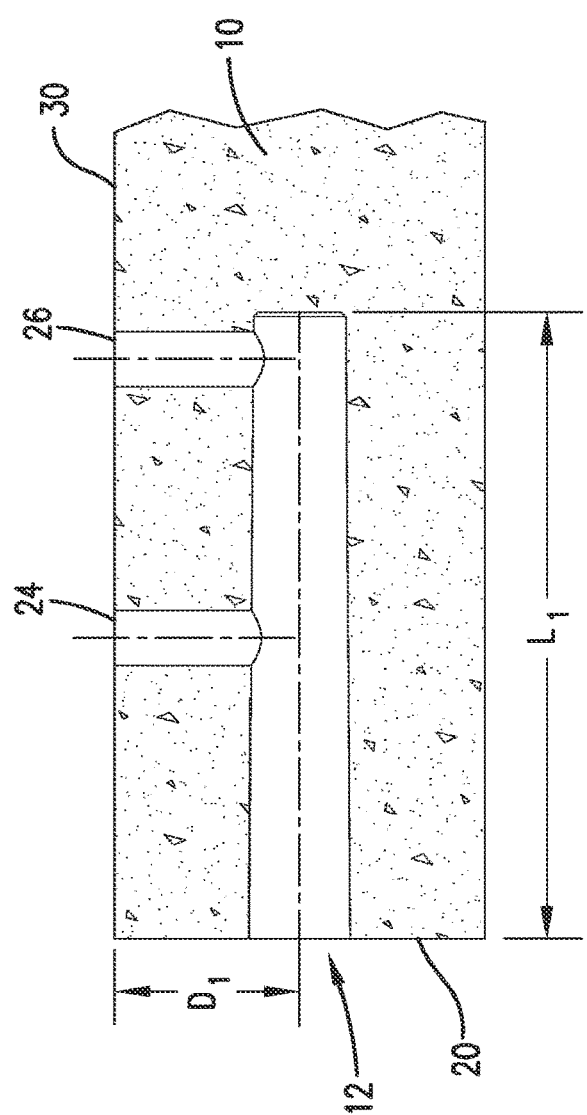
FIG. 2 is an enlarged sectional side view of a long cavity of the modular pavement slab shown in FIG. 1 taken along line 2-2.

FIG. 2 is an enlarged section view of the modular pavement slab 10 shown in FIG. 1 taken along line 2-2, illustrating a sectional side view of a long cavity 12. In the exemplary embodiment, the long cavity 12 has a length $L_1$ from a face of the modular pavement slab 10, such as the third face 20 shown in FIG. 2. The long cavity 12 also defines a longitudinal axis that is generally parallel to the substantially horizontal top surface 30 of the modular pavement slab 10. However, in some suitable embodiments, the longitudinal axis of the long cavity 12 may be oriented at any angle relative to the top surface 30 that enables the modular pavement slab 10 to function as described herein.

Each long cavity 12 is spaced vertically a distance $D_1$ from the top surface 30 of the modular pavement slab 10. In a preferred embodiment, the distance $D_1$ is defined at approximately a vertical midpoint of the vertical face of the modular pavement slab 10. Alternatively, the distance $D_1$ may be any measurement that enables the modular pavement slab 10 to function as described herein.

As illustrated in FIG. 2, the vertical passages 24 and 26 are preferably vertical, defining axes that are substantially orthogonal of the longitudinal axis of the long cavity 12. However, the passages may be oriented other than substantially vertically without departing from the scope of the present invention. For example, as described in the Sylvester patent, the passages 24 and 26 may permit access to a pipe auger and/or permit access to spacer devices, even if oriented other than substantially orthogonal to the substantially horizontal top surface 30 of the modular pavement slab 10.

Figure 3:
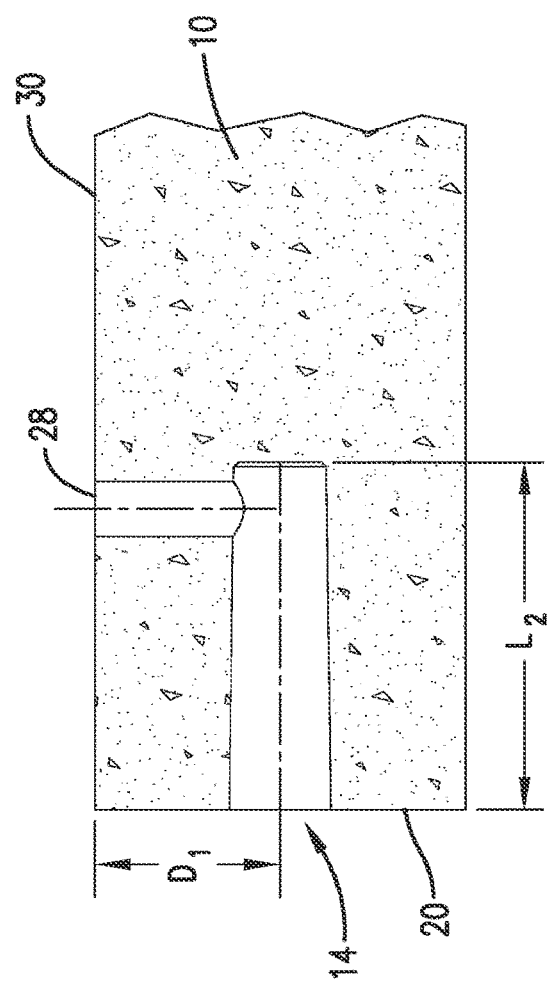
FIG. 3 is an enlarged sectional side view of a short cavity of the modular pavement slab shown in FIG. 1 taken along line 3-3.

FIG. 3 is an enlarged section view of the modular pavement slab 10 shown in FIG. 1 taken along line 3-3, illustrating a sectional side view of a short cavity 14. In the exemplary embodiment, the short cavity 14 has a length $L_2$ from a face of the modular pavement slab 10, such as the third face 20 shown in FIG. 3. The short cavity 14 also defines a longitudinal axis that is generally parallel to the substantially horizontal top surface 30 of the modular pavement slab 10. However, in some suitable embodiments, the longitudinal axis of the short cavity 14 may be oriented at any angle relative to the top surface 30 that enables the modular pavement slab 10 to function as described herein.

Each short cavity 14 is spaced vertically the distance $D_1$ from the top surface 30 of the modular pavement slab 10, thereby enabling the short cavity 14 of one modular pavement slab 10 to be generally collinear with a respective long cavity 12 of a second modular pavement slab 10 during assembly of a portion of pavement.

As illustrated in FIG. 3, the vertical passage 28 is preferably vertical, defining an axis that is substantially orthogonal of the longitudinal axis of the short cavity 14. However, while the passage may be oriented other than substantially vertically without departing from the scope of the present invention.

As shown in FIG. 1, the long cavity 12, short cavity 14, and the vertical passages 24, 26, and 28 are generally cylindrical in shape. However, it is contemplated that the cavities and vertical passages can have any cross-sectional shape that enables the cavities and vertical passages to function as described herein.

Turning now to FIGS. 4-7, a long forming tool 100 is illustrated from a variety of perspectives. It is noted that the long forming tool 100 described herein is used to form a corresponding long cavity 12, shown in FIGS. 1-3. One of ordinary skill will appreciate that the long forming tool 100 may be modified to form a corresponding short cavity 14, shown in FIGS. 1-3, by shortening the elongate body 102 to exclude a second riser bore (shown in FIG. 8*b*). As such, the long forming tool 100 will be described herein in detail, with particular reference to FIGS. 4-7. The differences with respect to the short forming tool 100' will be noted, as appropriate.

Figure 4:
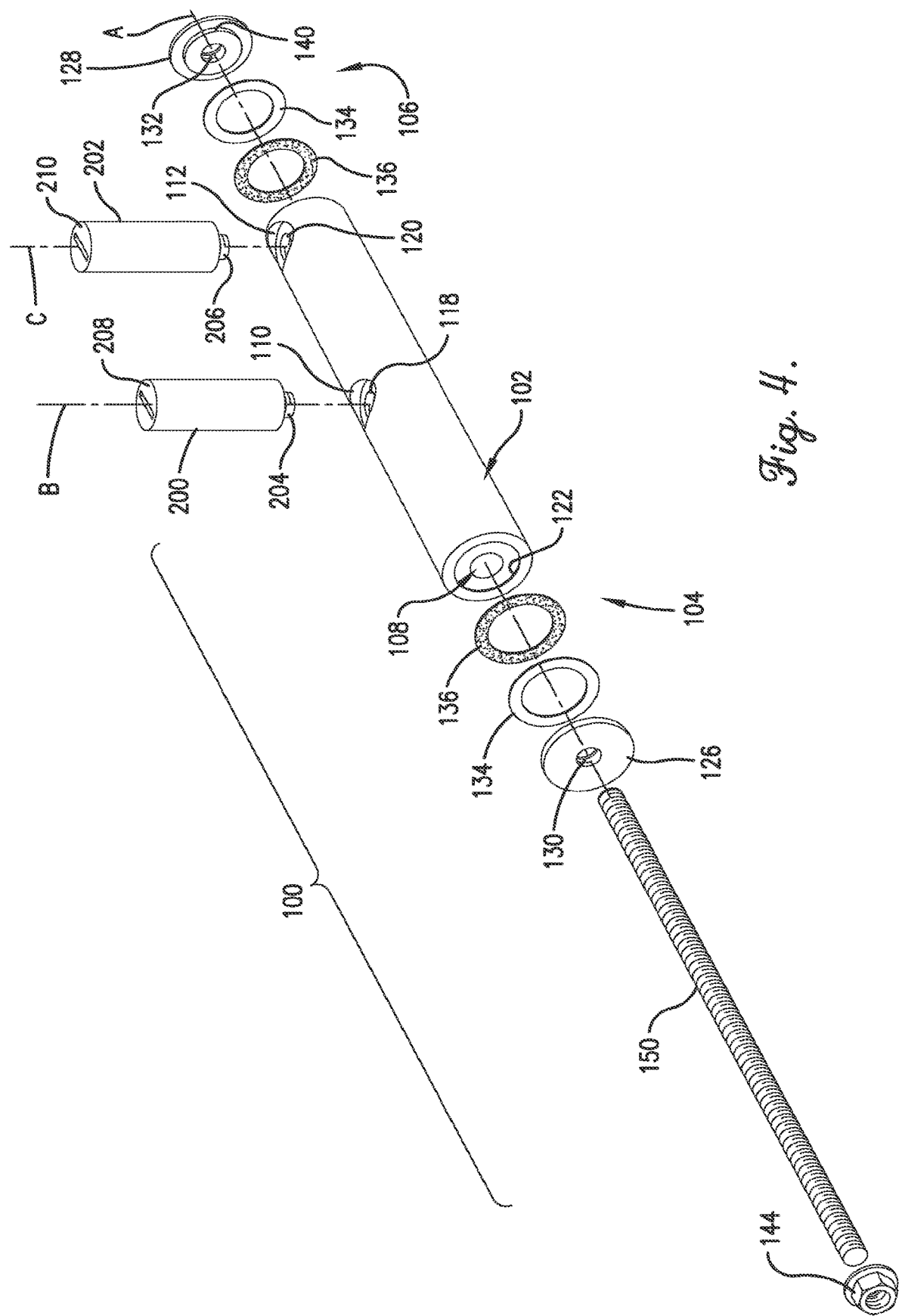
FIG. 4 is an exploded perspective view of a long forming tool shown.

Referring to FIG. 4, in the exemplary embodiment, the long forming tool 100 includes an elongate body 102 defining a longitudinal axis "A." The elongate body 102 includes a proximal end 104 positionable against an inner vertical surface 304 of a first header 302 of a modular pavement slab form 300 (shown in FIG. 8*a*), an opposite distal end 106, and a longitudinal bore 108 extending from the proximal end 104. Referring back to FIG. 7, in the exemplary embodiment, the longitudinal bore 108 extends through the elongate body 102 from the proximate end 104 to the distal end 106, although in certain embodiments, it is contemplated that the longitudinal bore 108 may only extend partially through the elongate body 102 from the proximate end 104.

As shown in FIG. 4, the elongate body 102 includes a first riser bore 110 defining a riser bore axis "B" that is noncollinear to the longitudinal axis "A." The elongate body 102 also includes a second riser bore 112 defining a riser bore axis "C" that is noncollinear to the longitudinal axis "A." In the exemplary embodiment, the riser bore axis "B" and the riser bore axis "C" are substantially parallel and lie in the same plane (not shown). Alternatively, the riser bore axis "B" and the riser bore axis "C" can be oriented at any angle relative to the longitudinal axis "A" that enables the long forming tool 100 to function as described herein.

In the exemplary embodiment, the elongate body 102 is substantially tubular and includes a tapered sidewall 103 that tapers or narrows as it extends from the proximal end 104 toward the distal end 106 of the elongate body 102. The tapered sidewall 103 facilitates ease of removal of the elongate body 102 from the modular pavement slab 10 (e.g., by lessening vacuum pressure opposition) after slab formation and curing. In certain other embodiments, the elongate body 102 can have any cross-sectional shape that enables the long forming tool 100 to function as described herein.

The short forming tool 100' (shown in FIG. 8*b*) is substantially similar to the long forming tool 100; however, the elongate body 102' (shown in FIG. 8*b*) is shortened to remove the second riser bore 112. As such, a distal end 106' (shown in FIG. 8*b*) of the short forming tool 100' is located proximate a first riser bore 110' (shown in FIG. 8*b*).

Referring back to FIG. 4, in the exemplary embodiment, each of the riser bores 110 and 112 are counterbores formed in the tapered sidewall 103 of the elongate body 102. As shown in FIG. 7, the riser bores 110 and 112 extend to a depth within the tapered sidewall 103 of the elongate body 102 that enables sidewalls of the risers 200 and 202 to respectively engage the tapered sidewall 103 of the elongate body 102. That is, the riser 200 defines a continuous intersection line 114 with the elongate body 102 as shown in FIG. 5, and the riser 202 defines a continuous intersection line 116 with the elongate body 102.

The riser bores 110 and 112 also include riser bore coupling surfaces 118 and 120 defined therein and configured for releasable connection to the respective risers 200 and 202. In the exemplary embodiment, the riser bore coupling surfaces 118 and 120 include female threads extending through the tapered sidewall 103 to the longitudinal bore 108, as shown in FIG. 7. Alternatively, the riser bore coupling surfaces 118 and 120 may be any type of releasable coupling surface that enables the long forming tool 100 to function as described herein, including, for example, a quick-release or detent coupling surface or the like.

It should also be noted that, in one or more embodiments, the tapered shape of the exterior surface of the sidewall 103 may form an outer margin of the tool 100 substantially in the shape of a frustum (preferably, but not necessarily, a conical frustum) along at least a majority of the axial length of the sidewall 103 and/or of the axial length of the elongate body 102. In one or more embodiments, the frustum shaped outer margin is defined along a portion of the sidewall 103 that includes one or more areas of intersection with the riser(s), 200, 202 (e.g., encompassing one or both of continuous intersection lines 114, 116). The substantially conical frustum-shaped margin may be substantially uninterrupted by radially-extending protrusions or the like, facilitating ease of removal of the elongate body 102 from the modular pavement slab 10 (e.g., by lessening vacuum pressure opposition) after slab formation and curing.

More particularly, the continuous intersection lines 114, 116 of the body 102 and the riser bores 110, 112 preferably do not protrude radially outward beyond the outer margin defined by exterior surfaces of the sidewall 103 in the shape of a conical frustum. That is, the sidewall 103 preferably does not include a collar, rim or similar structure for receiving and securing either riser 200, 202 that protrudes radially outward beyond the outer margin defined substantially in the shape of a conical frustum. Accordingly, upon removal of the risers 200, 202, the outer margin of the sidewall 103 may be more easily removed from the slab after formation and curing without interference from any such protrusions.

The long forming tool 100 also includes a fastener 150. In the exemplary embodiment, the fastener 150 extends through the longitudinal bore 108 of the elongate body 102. The fastener 150 is coupled to the elongate body 102. For example, in one suitable embodiment, the fastener 150 is coupled to an optional end plate, as described in detail below.

As described herein, in certain embodiments, the long forming tool 100 includes a first end plate 126 positioned at the proximal end 104 of the elongate body 102 and/or a second end plate 128 positioned at the distal end 106 of the elongate body 102. Each of the end plates 126 and 128 has a peripheral size and shape that substantially corresponds to the peripheral size and shape of the elongate body 102. Furthermore, the end plates 126 and 128 respectively include end plate coupling surfaces 130 and 132. The coupling surfaces 130 and 132 are configured for releasable connection with the fastener 150. In addition, as illustrated in FIG. 7, the end plate 128 may include a chamfered or otherwise tapered outer edge 142 to facilitate ease of removal of the elongate body 102 from the modular pavement slab 10 (e.g., by lessening vacuum pressure opposition) after slab formation and curing.

In embodiments of the long forming tool 100 that include the optional first end plate 126 and/or the end plate 128, the long forming tool 100 may also include a flat washer 134 adjacent each respective end plate 126 and 128 and positioned between the end plate and the elongate body 102. The flat washer 134 is configured to absorb crimping from repeated fastening stresses, distribute pressure, and prevent leakage into the longitudinal bore 108.

Furthermore, the long forming tool 100 may optionally include one or more gaskets or seals 136. For example, and without limitation, in embodiments of the long forming tool 100 that include the optional first end plate 126 and/or the end plate 128, and/or the flat washers 134, a seal 136 may be positioned between one of the end plates 126, 128 and a respective flat washer 134 to facilitate providing a seal that prevents or restricts the ingress of pavement material (e.g., concrete) into the longitudinal bore 108 during the forming and curing process of the modular pavement slab 10.

In some embodiments, the elongate body 102 optionally includes an axially-extending surface 122 located at the proximate end 104 and/or an axially-extending surface 124 located at the distal end 106. The axially-extending surfaces 122 and/or 124 are configured to engage a respective end plate 126 and 128. In such an embodiment, the end plates 126 and 128 include a complementary axially-extending surface 138 and 140, respectively. The end plates 126 and/or 128 are attached to the elongate body 102 such that the axially-extending surfaces 122 and/or 124 of the elongate body 102 and the corresponding axially-extending surfaces 138 and/or 140 of the end plates are at least partially nested to reduce relative movement between a respective end plate 126 and/or 128 and the elongate body 102.

In certain embodiments of the long forming tool 100, the end plate coupling surfaces 130 and 132 include female threads extending through the respective end plate 126 and 128, as shown in FIG. 4. The fastener 150 may include a threaded rod or bolt that threadedly engages the end plate coupling surfaces 130 and 132 to releasably connect the elongate body 102 to the inner vertical surface 304 of the first header 302 of the modular pavement slab form 300 (shown in FIG. 8a), as described further herein. Alternatively, the coupling surfaces 130 and 132 and the fastener 150 may be any type of releasable coupling surfaces that enables the long forming tool 100 to function as described herein, including, for example, a quick-release or detent coupling surface and the like.

In certain embodiments, the long forming tool 100 includes a fastener coupling member 144 coupled to the fastener 150 at the proximal end 104 of the elongate body 102. In a preferred embodiment of the present invention, the fastener 150 is a male threaded fastener (e.g., a threaded rod) and the fastener coupling member 144 is a female threaded coupling member (e.g., a threaded nut) threadedly coupled to the male threaded fastener 150 at the proximal end 104 of the elongate body 102. In another suitable embodiment, the fastener 150 is a male threaded bolt having a fixed head located at the proximal end 104 of the elongate body 102 and the fastener coupling member 144 is a female threaded coupling surface (e.g., a threaded nut) threadedly coupled to the fastener 150 at the distal end 106 of the elongate body 102.

Referring to FIG. 5, the long forming tool 100 includes the risers 200 and 202 coupled to the elongate body 102. In the exemplary embodiment, the risers 200 and 202 are substantially cylindrical and include riser coupling surfaces 204 and 206 (shown in FIG. 4) configured for releasable connection of risers 200 and 202 to corresponding riser bore coupling surfaces 118 and 120, wherein the riser bore coupling surfaces 118 and 120 and corresponding riser coupling surfaces 204 and 206 releasably connect to form fixed riser connections. In one example embodiment, the riser bore coupling surfaces 118 and 120 are female threaded coupling surfaces and the riser coupling surfaces 204 and 206 are male threaded coupling surfaces threadedly engaging the female threaded coupling surfaces 118 and 120 to form the fixed riser connections. As described herein, the riser bore coupling surfaces 118 and 120 and corresponding riser coupling surfaces 204 and 206 may form any type of releasable connection that enables the long forming tool 100 to function as described herein, including, for example, a quick-release or detent connection and the like.

The risers 200 and 202 also include respective slots 208 and 210 formed in distal ends of the risers 200 and 202 opposite the riser coupling surfaces 204 and 206. The slots 208 and 210 are configured to accept a tool (e.g., a screwdriver) to facilitate removing the risers 200 and 202 from the modular pavement slab 10 after curing. In one example, the risers 200 and 202 may be fabricated from a solid material, such as a metal, wherein the slots 208 and 210 are machined into the ends of the risers 200 and 202. Alternatively, the risers 200 and 202 may be fabricated from any material and in any manner that enables the forming tool 100 to function as described herein. Moreover, the slots may be replaced with any other type of driver-engaging surface without departing from the scope of the present invention.

The riser coupling surfaces 204 and 206 may be tapered toward respective proximal ends of the risers 200, 202. Moreover, exterior surfaces of the sidewalls of the risers 200, 202, respectively extending from distal ends of the risers 200, 202 (adjacent slots 208, 210) to the riser coupling surfaces 204, 206, may taper toward the riser coupling surfaces 204, 206. Such tapering may be present in sidewalls of elongate bodies and risers of various embodiments of the present invention without departing from the spirit of the present invention. The tapered exterior surfaces of the sidewalls of the risers 200, 202 facilitate ease of removal of the risers 200, 202 from the modular pavement slab (e.g., by lessening vacuum pressure opposition) after slab formation and curing.

Figure 8A:
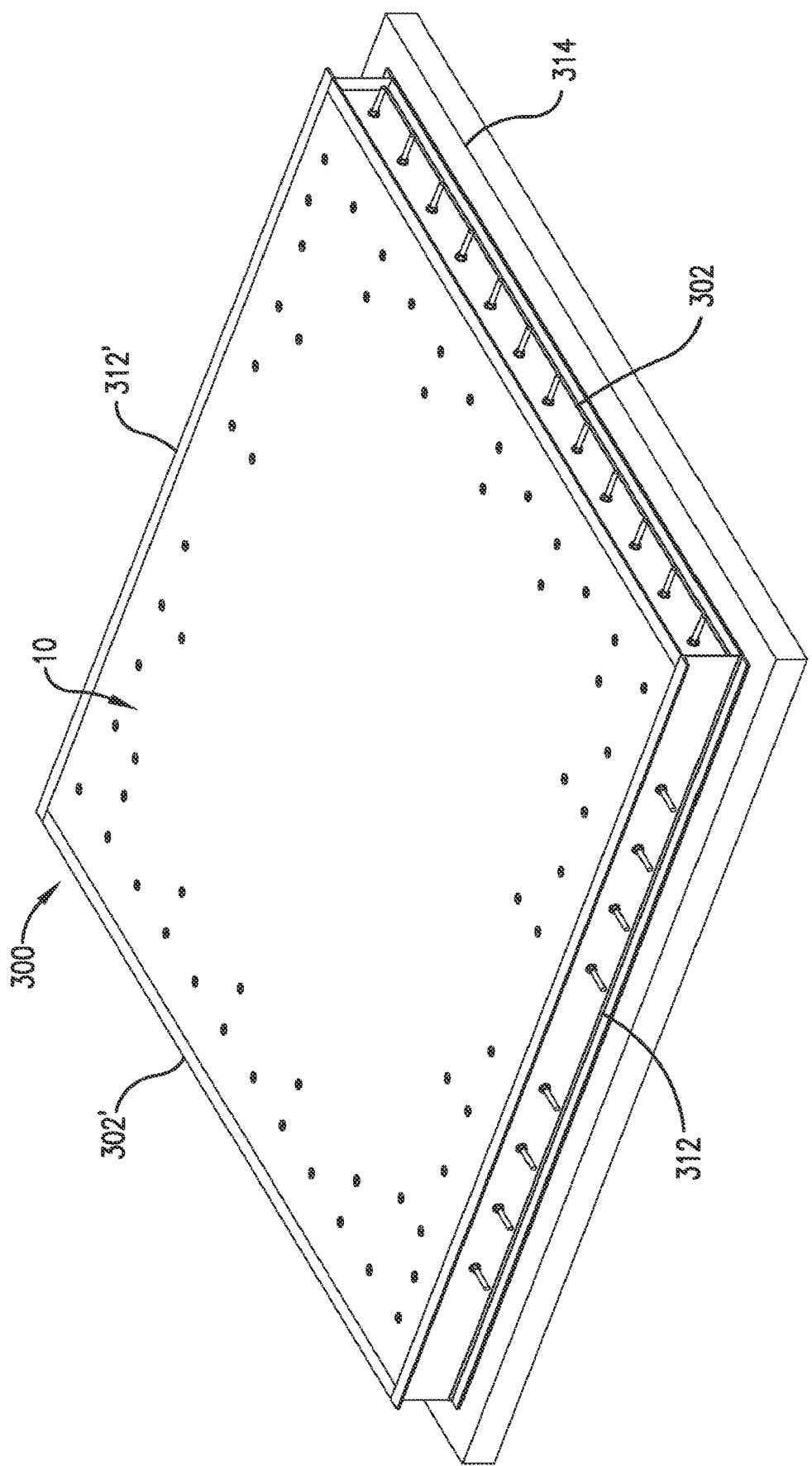
FIG. 8a is a perspective view of a modular pavement slab form and the modular pavement slab shown in FIG. 1.
Figure 8B:
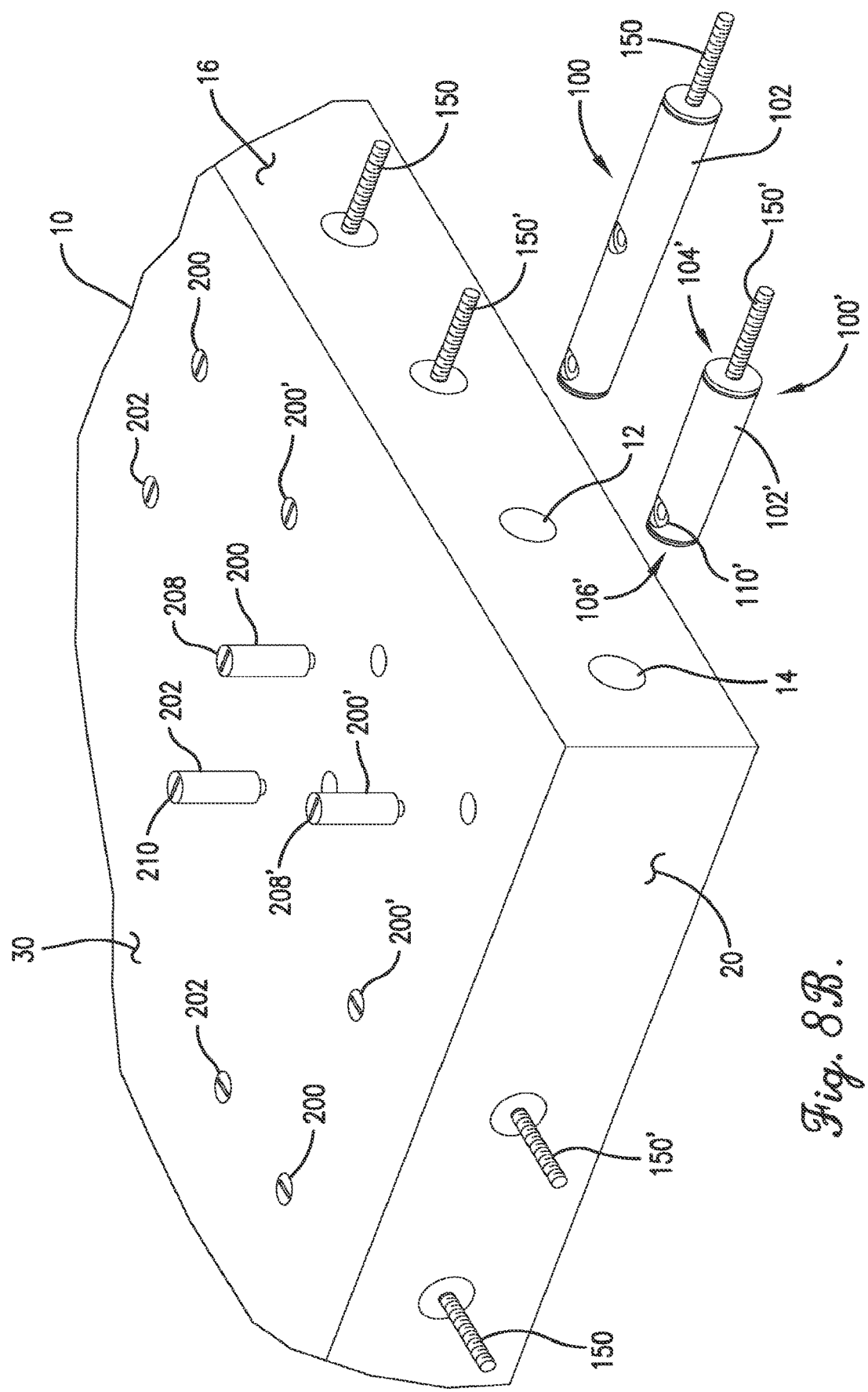
FIG. 8b is an enlarged partial view of the modular pavement slab shown in FIG. 1, illustrating a plurality of forming tools of the form used to form the pluralities of long cavities and short cavities.

FIG. 8a is a perspective view of a modular pavement slab form 300 and the modular pavement slab 10. FIG. 8b is an enlarged partial view of the modular pavement slab form 300 (having headers 302 and 312 removed) and the modular pavement slab 10, illustrating a plurality of the forming tools 100 and 100' of the modular pavement slab form 300. In the exemplary embodiment, the modular pavement slab form 300 includes four (4) headers defining a periphery of the modular pavement slab form 300. The four headers include the first header 302, a second header 302' opposite the first header 302, a third header 312 extending between ends of the first and second headers 302 and 302', and a fourth header 312' opposite the third header 312. The headers 302, 302', 312, and 312' are coupled to a casting table 314.

Referring to FIG. 8b, the tools 100 and 100' are used to form the plurality of long cavities 12 and short cavities 14 therein. In the exemplary embodiment, after the modular pavement slab 10 is cured and the headers of the modular pavement slab form 300 (shown in FIG. 8b without headers) are removed therefrom, the forming tools 100 and 100' are removed from the modular pavement slab 10. As illustrated in FIG. 8b, the plurality of risers 200 and 202 of the tools 100 are removed from the elongate bodies 102 of the long forming tools 100. The risers 200 and 202 are removed in a vertical direction from the modular pavement slab 10 after being disconnected from the elongate bodies 102. Each elongate body 102 includes the releasably attached fastener 150, which can be used to remove the elongate body 102 from the modular pavement slab 10. Similarly, each riser 200' is removed in a vertical direction from the modular pavement slab 10 after being disconnected from the corresponding elongate body 102' of each short forming tool 100'. Each elongate body 102' includes a corresponding releasably attached fastener 150', which can be used to remove the corresponding elongate body 102' from the modular pavement slab 10.

FIG. 9 is a side sectional view of the long forming tool 100 coupled to the first header 302 of modular pavement slab form 300. In the exemplary embodiment, the first header 302 includes an inner vertical surface 304, an outer vertical surface 306, and a top surface 308. The inner vertical surface 304 is configured to define at least a portion of the periphery of the modular pavement slab 10 during formation of the modular pavement slab 10, such as at least one of the faces 16, 18, 20, and 22 (shown in FIG. 1). While FIG. 9 illustrates a long forming tool 100 coupled to the first header 302, one of ordinary skill will appreciate that a short forming tool 100' may be placed alternatingly between long forming tools 100 along the inner vertical surface 304 of the first header 302 to generate alternating long and short cavities 12 and 14 (shown in FIG. 1). One of ordinary skill will further appreciate that short forming tools 100' may be employed in pavement slab fabrication processes in substantially the same fashion as the long forming tool 100, as discussed in more detail herein.

In the exemplary embodiment, a plurality of short forming tools 100' are coupled to the inner vertical surface 304 of the first header 302. More particularly, for each short forming tool 100', the fastener 150' (shown in FIG. 4) is coupled to the elongate body 102', with the fastener 150' extending through the first header 302. A fastener coupling member 144 is releasably coupled to the fastener 150' against the outer vertical surface 306 of the first header 302. The riser 200' (shown in FIG. 4) is coupled to the riser bore 110' with the short form tool 100' oriented such that the riser 200' extends to a vertical position corresponding to or above a vertical position of the top surface 308 of the first header 302, and in certain embodiments, at or above the top surface 30 of the modular pavement slab 10.

Furthermore, a plurality of long forming tools 100 are coupled to the inner vertical surface 304 of the first header 302 alternatingly with the short forming tools 100'. More particularly, for each long forming tool 100, the fastener 150 is coupled to the elongate body 102 with the fastener 150 extending through the first header 302. A fastener coupling member 144 is releasably coupled to the fastener 150 against the outer vertical surface 306 of the first header 302. The risers 200 and 202 are coupled to the riser bores 110 and 112, respectively, with the long form tool 100 oriented such that the risers 200 and 202 extend to a vertical position corresponding to or above a vertical position of the top surface 308 of the header 302, and in certain embodiments, at or above the top surface 30 of the modular pavement slab 10.

Modular pavement slab form 300 includes the second header 302' positioned opposite and disposed parallel to the first header 302. The second header 302' includes a second inner vertical surface configured to define at least a second portion of the periphery of the modular pavement slab 10, such as at least one of the faces 16, 18, 20, and 22 (shown in FIG. 1). A plurality of additional short forming tools 100' are coupled to the inner vertical surface of the second header 302' with each additional short forming tool 100' positioned on the second header 302' opposite a respective one of the long forming tools 100 of the first header 302. In addition, the modular pavement slab form 300 includes a plurality of additional long forming tools 100 coupled to the inner vertical surface of the second header 302' with each additional long forming tool 100 positioned on the second header 302' opposite a respective one of the short forming tools 100' of the first header 302.

Furthermore, as described above, the modular pavement slab form 300 includes the third header 312 extending between ends of the first and second headers 302 and 302'. The fourth header 312' is positioned opposite of and disposed parallel to the third header 312. The third and fourth headers 312 and 312' include inner vertical surfaces configured to define additional portions of the periphery of the modular pavement slab 10, such as one or more of the faces 16, 18, 20, and 22 (shown in FIG. 1).

A plurality of long forming tools 100 and short forming tools 100' are alternatingly arranged and coupled to the inner vertical surface of the third header 312 in substantially the same manner as described above in connection with headers 302 and 302'. Furthermore, the plurality of long forming tools 100 and short forming tools 100' of the third header 312 are arranged in two (2) spaced groupings.

A plurality of additional long forming tools 100' and short forming tools 100' are alternatingly arranged and coupled to the inner vertical surface of the fourth header 312' in substantially the same manner as described above in connection with headers 302 and 302'. The plurality of long forming tools 100 and short forming tools 100' of the fourth header 312' are similarly arranged in two (2) spaced groupings, where a short forming tool 100' is positioned opposite a respective one of the short forming tools 100' of the third header 312, and each additional long forming tool 100 positioned opposite a respective one of the long forming tools 100 of the third header 312.

FIG. 10 is a side sectional view of the modular pavement slab 10 having the first header 302 (shown in FIG. 9) removed and illustrating the long forming tool 100 positioned within the long cavity 12, with the risers 200 and 202 removed. In the exemplary embodiment, the risers 200 and 202 are removed from the elongate body 102, for example, by using a tool (not shown) to engage the slots 208 and 210 (shown in FIG. 9) and turning the risers 200 and 202 to disengage the riser coupling surfaces 204 and 206 from corresponding riser bore coupling surfaces 118 and 120.

After the first header 302 is removed, the remaining portion of the long forming tool 100, including the elongate body 102, may be extracted from the modular pavement slab 10 by pulling the fastener 150 along the longitudinal axis "A" of the long forming tool 100. The taper or draft of the sidewall 103 of the elongate body 102 facilitates reducing a force necessary to extract the long forming tool 100 from the modular pavement slab 10.

Figure 11:
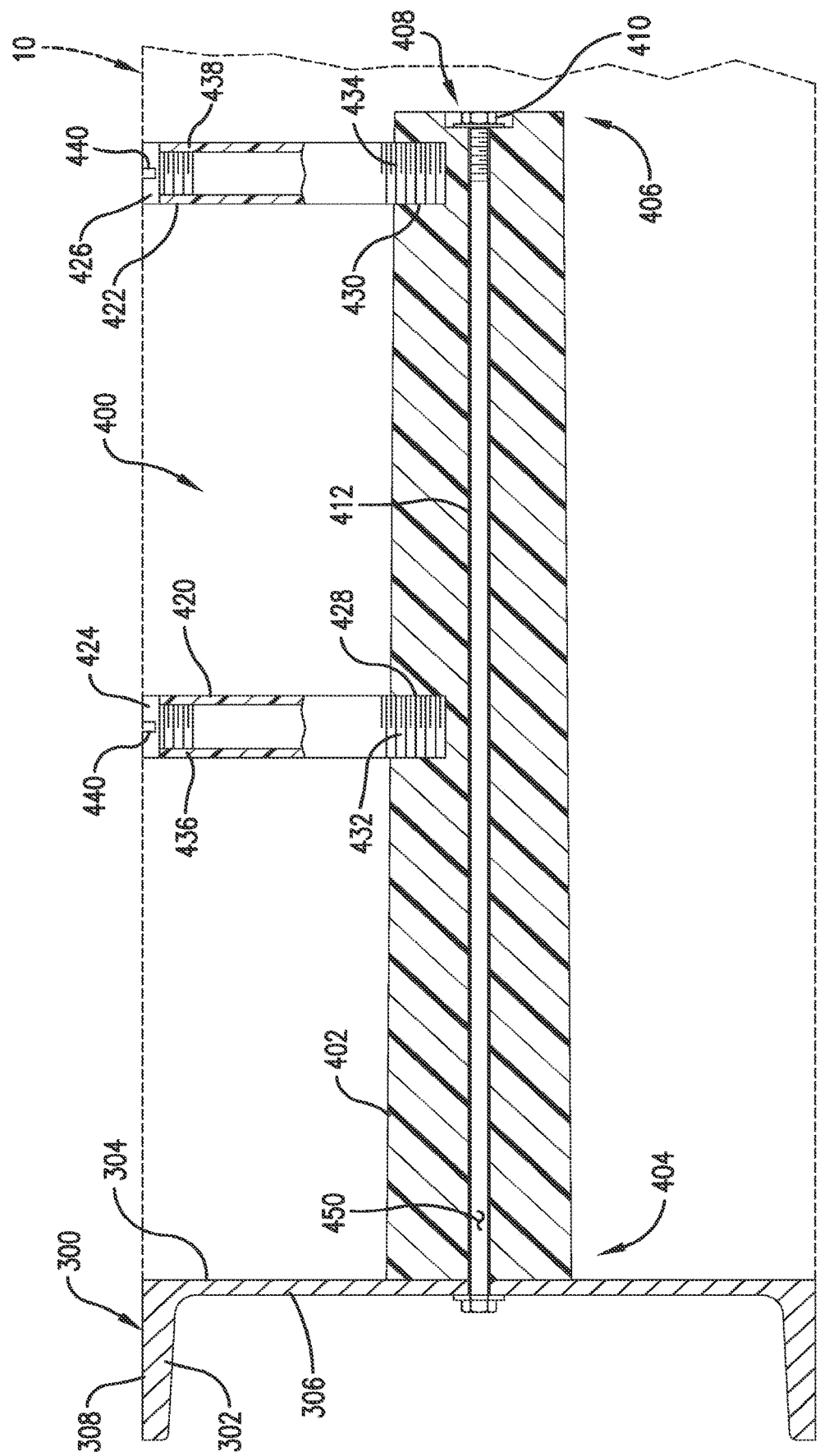
FIG. 11 is a side sectional view of an alternative embodiment of a long forming tool, shown assembled to the header.

FIG. 11 is a side sectional view of an alternative embodiment of a long forming tool 400, shown assembled to the first header 302 of modular pavement slab form 300. One of ordinary skill will appreciate that the long forming tool 400 can be modified to form a respective short cavity 14, shown in FIGS. 1-3, by shortening the long forming tool 400 to exclude a second riser bore, as described above with respect to the short forming tool 100'. As such, only the long forming tool 400 will be described herein in detail. The differences with respect to a short forming tool 400' will be noted, as appropriate. It is further noted that, with certain exceptions to be discussed herein, many of the elements of the second embodiment of the long forming tool 400 and the short forming tool 400' are the same as or substantially similar to those described in detail above in relation to the long forming tool 100 and the short forming tool 100' of the first embodiment. Unless otherwise specified herein, the detailed descriptions of the elements presented above with respect to the long forming tool 100 and the short forming tool 100' of the first embodiment should therefore be understood to apply at least generally to the long forming tool 400 and the short forming tool 400' of the second embodiment, as well.

The long forming tool 400 includes an elongate body 402 that includes a tapered tube (or "nylon plug"). The tapered tube is for ease of removal from a cured modular pavement slab 10. The elongate body 402 includes a proximate end 404 positioned adjacent the first header 302. In addition, the elongate body 402 extends away from the first header 302 and terminates at a smaller, distal end 406 defining a recess 408 therein for receiving a fastener coupling member 410. The elongate body 402 defines a central passage or bore 412 for receiving a fastener 450 therethrough. The fastener 450 is releasably fixed to the first header 302 at the proximate end 404 of the elongate body 402. The first header 302 (and other headers of the module pavement slab form 300) may be fixed to a casting table 314 (shown in FIG. 8a) or the like. Tightening the fastener coupling member 410 to the fastener 450 in the recess 408 secures the elongate body 402 against the first header 302.

The long forming tool 400 includes a first riser 420 and a second riser 422 attached to the elongate body 402, for example, at corresponding riser bores 428 and 430. In the illustrated embodiment, the risers 420 and 422 are tubular and include externally threaded first ends 432 and 434, respectively. The opposite ends of the risers 420 and 422 include internally threaded second ends 436 and 438, respectively. The risers 420 and 422 further include corresponding threaded caps or plugs 424 and 426 attached, respectively, to the internally threaded second ends 436 and 438. Each cap 424 and 426 includes a slot 440 defined therein, for receiving, for example, a tool.

Figure 12:
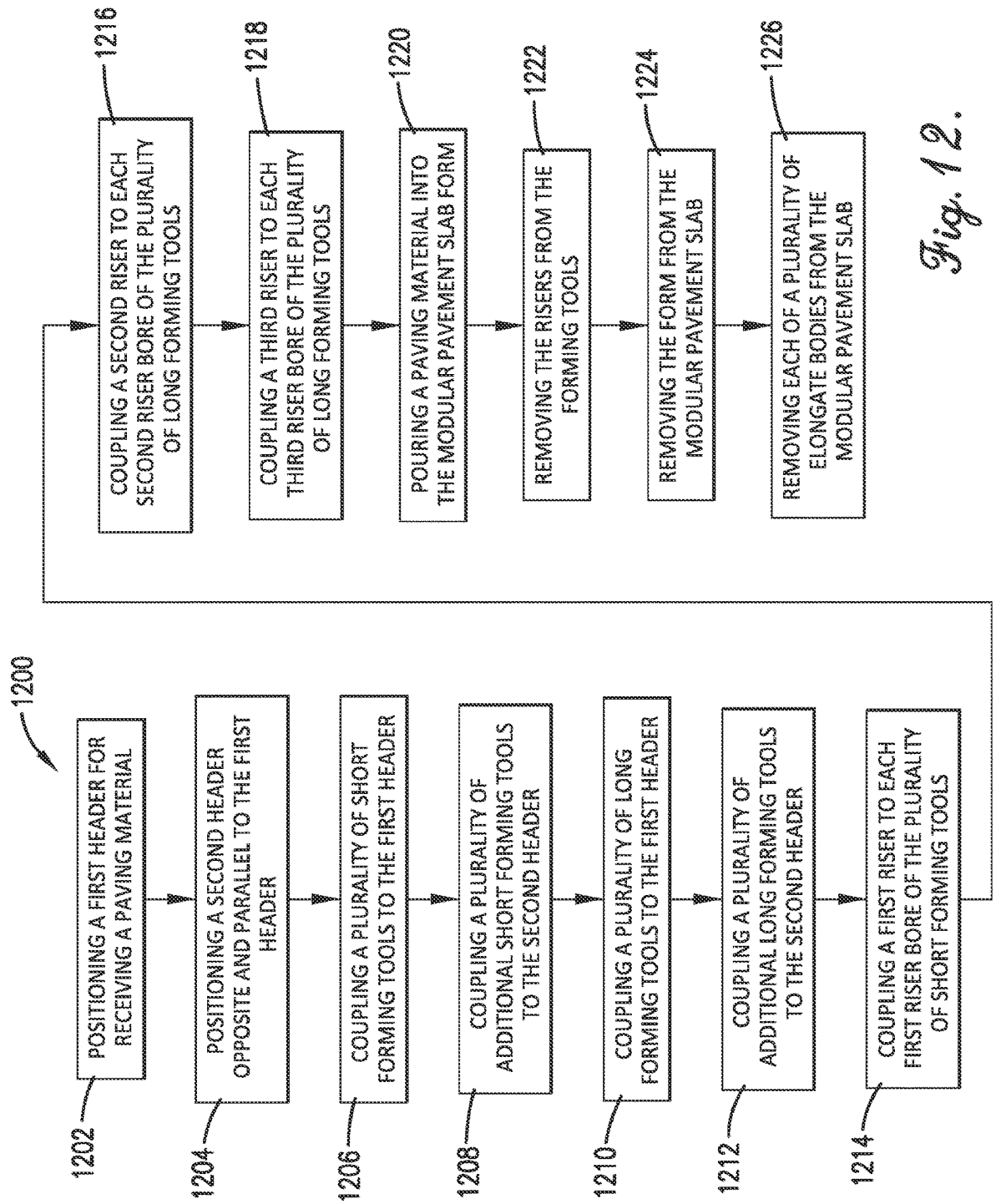
FIG. 12 is a listing of steps of an exemplary method of forming the modular pavement slab shown in FIG. 1 having alternating pluralities of long and short cavities formed around a periphery of the modular pavement slab.

FIG. 12 is a listing of steps or operations of an exemplary method 1200 of forming the modular pavement slab 10 having pluralities of long and short cavities 12 and 14 alternatingly formed around a periphery of the modular pavement slab 10. The steps described herein may be performed in the order shown in FIG. 12 or, according to certain inventive aspects, may be performed in a different order. Furthermore, some steps may be performed concurrently as opposed to sequentially, and/or some steps may be optional, unless expressly stated otherwise or as may be readily understood by one of ordinary skill in the art.

The method 1200 is described below, for ease of reference, as being performed with the exemplary long forming tools 100 and short forming tools 100' described above with reference to FIGS. 1-10. However, a person having ordinary skill in the art will appreciate that embodiments of the method 1200 may be performed using different forming tools taught by and/or clearly recognizable within the present description and drawings without departing from the scope of the present invention.

Initially, it should be noted that the modular pavement slab form 300 (shown in FIG. 9) is referred to in the following description of the method 1200 for fabrication of the modular pavement slab 10. It should be further noted that various methods and hardware for retaining concrete or other paving materials forming the modular pavement slab 10 in a desired shape for curing may be used with forming tools of embodiments of the present invention (e.g., the long forming tools 100 and 400, and the short forming tools 100' and 400') without departing from the scope of the present invention. Modular pavement slab form 300 may optionally cooperate with a casting table 314 (shown in FIG. 8*a*) or the like within the scope of the present invention.

At step 1202, the method 1200 includes assembling the modular pavement slab form 300 by positioning the first header 302 for receiving a paving material. The first header 302 includes the inner vertical surface 304, the outer vertical surface 306, and the top surface 308 described above. The inner vertical surface 304 is configured to define at least a portion of the periphery of the modular pavement slab 10 during formation of the modular pavement slab 10. In addition, at step 1204, the method 1200 includes positioning a second header 302' opposite and parallel to the first header 302.

A hole 310 (shown in FIG. 9) may be drilled or bored through a side of the form 30, and more particularly, the header 302. The hole 310 may be centered along an anticipated centerline of the forming tools 100 and/or 100' to be aligned therewith, and may be located using the measurements, design, and layout considerations set forth in the Sylvester patent. Additional holes 310 may be drilled or bored along a length of each header 302, 302', 312, and 312' or side of modular pavement slab form 300, accounting for each of the long and short forming tools 100 and 100', respectively, to be secured adjacent thereto. Preferably, the diameter of each hole 310 is slightly larger than that of the fasteners 150 of the forming tools, and smaller than that of the coupling members or nuts 144 and/or heads of the fasteners 150 and 150'.

At step 1206, the method 1200 includes coupling a plurality of short forming tools 100' to the inner vertical surface 304 of the first header 302. Each short forming tool 100' includes, as described above, a first elongate body 102' defining a first longitudinal axis and having a first length $L_2$. The first elongate body 102' includes a first riser bore 110' defining a first riser bore axis that is noncollinear to the first longitudinal axis. The step 1206 includes, for each respective short forming tool 100', inserting a first fastener 150' through the hole 310 defined in the first header 302 and securing the first fastener 150' to the respective first elongate body 102'. In particular, the fastener 150' may be inserted through the elongate body 102' and coupled to the second end plate 128. The washer 134 and/or seal 136 may be positioned between the second end plate 128 and the elongate body 102' to seal over the fastener 150', thereby preventing or restricting ingress of concrete or other pavement material into the elongate body 102' during the curing process. The elongate body 102' may be advanced along a length of the fastener 150' until the first end plate 126 or the proximate end 104' of the elongate body 102' is flush against the inner vertical surface 304 of the first header 302. In conjunction or in addition, and referring to step 1206, the elongate body 102' may be secured along the length of the fastener 150'. More particularly, the elongate body 102' may be secured against the inner vertical surface 304 of the first header 302. In one embodiment, the second end plate 128 and the end of the fastener 150' may each be threaded so that the second end plate 128 may threadedly receive the end of the fastener 150'. A nut 144 or a head of the fastener 150' may be rotated to secure the elongate body 102' against the inner vertical surface 304 of the first header 302 via the threaded engagement between the second end plate 128 and the end of the fastener 150'. The second end plate 128 may likewise prevent or restrict ingress of paving materials into the elongate body 102.

At step 1208, the method 1200 includes coupling a plurality of additional short forming tools 100' to the inner vertical surface of the second header 302'. Each additional short forming tool 100' may be positioned on the second header 302' opposite a respective one of the long forming tools 100 of the first header 302 and is secured in substantially the same manner as described above in step 1206.

At step 1210, the method 1200 includes coupling a plurality of long forming tools 100 to the inner vertical surface 304 of the first header 302. The long forming tools 100 are disposed alternatingly with the short forming tools 100'. Each long forming tool 100 includes a second elongate body 102 defining a second longitudinal axis and having a second length $L_1$ that is longer than the first length $L_2$. The second elongate body 102 includes second and third riser bores 110 and 112. The second riser bore 110 defines a second riser bore axis that is noncollinear to the second longitudinal axis, and the third riser bore 112 defines a third riser bore axis that is noncollinear to the second longitudinal axis. The step 1210 includes, for each respective long forming tool 100, inserting a second fastener 150 through the hole 310 defined in the first header 302 and securing the second fastener 150 to the respective second elongate body 102 in substantially the same manner as described above in step 1206.

At step 1212, the method 1200 includes coupling a plurality of additional long forming tools 100 to the inner vertical surface of the second header 302'. Each additional long forming tool 100 is positioned on the second header 302' opposite a respective one of the short forming tools 100' of the first header 302 and is secured in substantially the same manner as described above in step 1206. In some suitable embodiments, pluralities of long and short forming tools 100 and 100' may be connected to additional headers of the modular pavement slab form 300, such as the third and fourth headers 312 and 312' described herein. In such embodiments, the long and short forming tools 100 and 100' may be arranged as desired, including in alternating patterns within spaced groupings as described above.

At step 1214, the method 1200 includes coupling a first riser 200' to each respective first riser bore 110' of the plurality of short forming tools 100'. More particularly, threaded ends of the risers 200' may be connected to corresponding riser bore coupling surfaces 118 of the riser bores 110'. In one suitable embodiment, a user may insert a tool (e.g., a screwdriver) into the slot 208' formed along the top of each riser 200' and rotate the riser 200' until fully inserted into the riser bore 110'.

At step 1216, the method 1200 includes coupling a second riser 200 to each respective second riser bore 110 of the plurality of long forming tools 100, and at step 1218, coupling a third riser 202 to each respective third riser bore 112 of the plurality of long forming tools 100. The risers 200 and 202 may be coupled to the elongate body 102 in substantially the same manner as described in step 1214 for the riser 200'. The above steps 1202, 1204, 1206, 1208, 1210, 1212, 1214, 1216, and 1218 may be repeated along the length of each header 302, 302', 312, and 312' or side of modular pavement slab form 300 for each of the cavities 12 and 14 (shown in FIG. 1) until all forming tools 100 and 100' are in place.

At step 1220, the method 1200 includes pouring a paving material into the modular pavement slab form 300 and allowing the paving material to set to define the modular pavement slab 10. Spots above the risers 200, 200', and 202 may be marked in the uncured paving material for later location, particularly if the risers 200, 200', and 202 do not protrude from the top surface 30 of the modular pavement slab 10. In a preferred embodiment, the paving material includes concrete, although, it is contemplated that any paving material may be used that enables the modular pavement slab 10 to be fabricated as described herein.

At step 1222, the method 1200 includes removing the first, second, and third risers 200', 200, and 202 from corresponding elongate bodies 102 and 102'. In particular, slots 208', 208, and 210 of the risers 200', 200, and 202 may be revealed and/or located and the risers removed from the elongate bodies 102 and 102' and from vertical or substantially vertical passages 24, 26, and 28. More particularly, in one suitable embodiment, the marks above the risers 200, 200', and 202 may be located and any paving material cured above the risers may be removed. A tool, such as a screwdriver or the like, may be inserted into the slots 208', 208, and 210 of the risers 200', 200, and 202, and each riser may be turned, unscrewed, or otherwise dislodged from the elongate bodies 102 and 102', and, once graspable, pulled clear of the modular pavement slab 10 through the top surface 30.

At step 1224, the method 1200 includes removing headers of the modular pavement slab form 300 from the modular pavement slab 10. In particular, the fastener 150 and 150' and/or the corresponding nut 144 may be removed from the elongate bodies 102 and 102' and the headers, such as the headers 302, 302', 312, and 312', may subsequently be removed from around the periphery of the modular pavement slab 10.

At step 1226, each of the first and second elongate bodies 102 and 102' may be removed from the modular pavement slab 10. For example, the fasteners 150 and 150' may be re-inserted into the elongate bodies 102 and 102' and the elongate bodies 102 and 102' may be pulled free from the modular pavement slab 10 through the first (side) face 16. More particularly, a respective fastener 150 and 150' may be inserted into the corresponding elongate body 102 and 102' until reaching the second end plate 128. The fasteners 150 and 150' may be rotated to threadedly engage with the second end plates 128, and the fasteners 150 and 150' pulled away from the modular pavement slab 10 to remove the elongate bodies 102 and 102' from the modular pavement slab 10. Preferably, the elongate bodies 102 and 102' and the risers 200', 200, and 202 are coated with a lubricant and/or other substance configured to prevent adherence of the paving material thereto to ease removal from the modular pavement slab 10. The above steps 1222, 1224, and 1226 may be repeated along the sides of modular pavement slab form 300 for each forming tool 100 and 100' until all forming tools are removed from their cavities 12 and 14.

The method may include additional, less, or alternate actions, including those discussed elsewhere herein and/or in the Sylvester patent, as well as those known to the person of ordinary skill for use in connection with fabricating a modular pavement slab.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the scope of the present invention.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, structure, act, etc. described in one embodiment may also be included in other embodiments but is not necessarily included. Thus, particular implementations of the present invention can include a variety of combinations and/or integrations of the embodiments described herein.

Furthermore, directional references (e.g., top, bottom, front, back, side, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Although the disclosure has been described with reference to the embodiments illustrated in the attached figures, it is noted that equivalents may be employed, and substitutions made herein, without departing from the scope of the disclosure as recited in the claims. The inventors hereby state their intent to rely on the Doctrine of Equivalents to determine and assess the reasonably fair scope of the present invention as pertains to any apparatus not materially departing from but outside the literal scope of the invention set forth in the following claims.

Having thus described various embodiments of the disclosure, what is claimed as new and desired to be protected by Letters Patent includes the following:

1. A forming tool for forming a cavity in a modular pavement slab fabricated using a form including a header, the forming tool comprising:
   an elongate body extending along a longitudinal axis and having a proximal end and a distal end, the proximal end of the elongate body being configured for releasable connection to the header; and
   a riser having a proximal end and a distal end, the proximal end of the riser being releasably connected to the elongate body and the riser extending from the elongate body in a direction noncollinear to the longitudinal axis,
   the elongate body including a sidewall exterior surface tapered from the proximal end of the elongate body toward the distal end of the elongate body.

2. The forming tool in accordance with claim 1, wherein the elongate body comprises a female threaded riser bore coupling surface and the riser comprises a male threaded riser coupling surface threadedly engaging the female threaded coupling surface to form the releasable connection between the riser and the elongate body.

3. The forming tool in accordance with claim 2, wherein the riser comprises a driver-engaging surface formed in the distal end of the riser opposite the riser coupling surface, the driver-engaging surface being configured for receipt of a tool for dislodging the riser from the riser bore coupling surface.

4. The forming tool in accordance with claim 1, wherein the sidewall exterior surface includes an area releasably connected to the riser and defining an outer margin having a substantially conical frustum shape uninterrupted by any protrusion.

5. The forming tool in accordance with claim 1, the riser including a sidewall exterior surface tapering from the distal end of the riser toward the proximal end of the riser.

6. A form for a modular pavement slab having pluralities of long and short cavities alternately formed around a periphery of the modular pavement slab, said form comprising:
   a header configured to define at least a portion of the periphery of the modular pavement slab during formation of the modular pavement slab;
   at least two short forming tools releasably coupled to the header, each short forming tool comprising:
      a short elongate body;
      a first riser coupled to the short elongate body; and
   at least two long forming tools releasably coupled to the header and disposed alternatingly with the at least two short forming tools, each long forming tool comprising:
      a long elongate body having a length that is longer than each of the at least two short elongate bodies;
      second and third risers coupled to the long elongate body.

7. The form in accordance with claim 6, further comprising:
   a second header disposed opposite the first header, the second header being configured to define at least a second portion of the periphery of the modular pavement slab;
   at least two additional short forming tools releasably coupled to the second header, each additional short forming tool positioned on the second header opposite a respective one of the at least two long forming tools of the header; and
   at least two additional long forming tools coupled to the second header, each additional long forming tool positioned on the second header opposite a respective one of the at least two short forming tools of the header.

8. The form in accordance with claim 6, the short forming tools and the long forming tools further comprising respective end plates positioned against distal ends of corresponding ones of the short and long elongate bodies, wherein the end plates are coupled to corresponding fasteners to releasably connect the short forming tools and the long forming tools to the header.

9. The form in accordance with claim 6, wherein each of the long and short elongate bodies comprises a tapered sidewall exterior surface.

10. The form in accordance with claim 9, wherein each of the first, second and third risers comprises a tapered sidewall exterior surface.

11. A method of forming a modular pavement slab having a plurality of cavities formed around a periphery of the modular pavement slab, said method comprising:
   positioning a header of a form for receiving a paving material;
   coupling a plurality of forming tools to the header, each forming tool comprising an elongate body defining a longitudinal axis and a riser releasably coupled to the elongate body and extending in a direction that is noncollinear to the longitudinal axis;
   pouring the paving material into the form and around the plurality of forming tools and allowing the paving material to set to define the modular pavement slab;
   removing each of the risers from the modular pavement slab; and
   removing each of the elongate bodies from the modular pavement slab.

12. The method in accordance with claim 11,
   said step of coupling the plurality of forming tools comprising, for each respective forming tool, inserting a fastener through an opening defined in the header and coupling the fastener to an end plate along a distal end of the corresponding elongate body.

13. The method in accordance with claim 12, wherein removing the elongate bodies comprises:

removing each of the fasteners from the corresponding elongate body;

removing the header from the modular pavement slab; and extracting each of the plurality of forming tools from the modular pavement slab.

14. The method in accordance with claim 11, further comprising, before pouring the paving material:

positioning a second header opposite the header;

coupling a plurality of additional forming tools to the second header, each additional forming tool comprising a second elongate body defining a second longitudinal axis and a second riser releasably coupled to the second elongate body and extending in a direction that is noncollinear to the second longitudinal axis.

15. The method in accordance with claim 11, wherein each of the elongate bodies comprises a tapered sidewall exterior surface.

16. A modular pavement slab comprising:

a paving material set around a plurality of forming tools and defining a side face and a top surface, each of the plurality of forming tools including— an elongate body extending along a longitudinal axis and having a sidewall exterior surface configured for removal of the elongate body through the side face, a riser releasably coupled to the elongate body and extending in a direction noncollinear to the corresponding longitudinal axis.

17. The modular pavement slab in accordance with claim 16, wherein the elongate body comprises a female threaded riser bore coupling surface and the riser comprises a male threaded riser coupling surface threadedly engaging the female threaded coupling surface to form the releasable connection between the riser and the elongate body.

18. The modular pavement slab in accordance with claim 17, wherein the riser comprises a driver-engaging surface formed in the distal end of the riser opposite the riser coupling surface, the driver-engaging surface being configured for receipt of a tool for dislodging the riser from the riser bore coupling surface.

19. The modular pavement slab in accordance with claim 16, wherein the sidewall exterior surface includes an area releasably connected to the riser and defines an outer margin having a substantially conical frustum shape uninterrupted by any protrusion.

20. The modular pavement slab in accordance with claim 16, the riser having a sidewall exterior surface configured for removal of the riser through the top surface.

\* \* \* \* \*